(12) United States Patent
Laakso et al.

(10) Patent No.: US 7,592,820 B2
(45) Date of Patent: Sep. 22, 2009

(54) ISOLATED MEASUREMENT CIRCUIT FOR SENSOR RESISTANCE

(75) Inventors: Kari-Matti Laakso, Pietarsaari (FI); Andreas Berts, Korsholm (FI)

(73) Assignee: ABB Oy, Helsinki (FI)

( * ) Notice: Subject to any disclaimer, the term of this patent is extended or adjusted under 35 U.S.C. 154(b) by 250 days.

(21) Appl. No.: 11/635,630

(22) Filed: Dec. 8, 2006

(65) Prior Publication Data

US 2007/0171055 A1   Jul. 26, 2007

Related U.S. Application Data

(63) Continuation of application No. PCT/FI2005/000267, filed on Jun. 8, 2005.

(30) Foreign Application Priority Data

Jun. 10, 2004   (FI) ................................. 20040802

(51) Int. Cl.
*G01R 27/08* (2006.01)
(52) U.S. Cl. ....................... 324/713; 327/362
(58) Field of Classification Search ................. 324/713, 324/702; 327/362, 83
See application file for complete search history.

(56) References Cited

U.S. PATENT DOCUMENTS

| | | | |
|---|---|---|---|
| 2,749,512 A | | 6/1956 | Blair |
| 2,871,446 A | | 1/1959 | Wann |
| 4,161,880 A | * | 7/1979 | Prosky ........................ 374/171 |
| 4,206,648 A | * | 6/1980 | Tuska et al. ................. 374/171 |
| 4,264,860 A | | 4/1981 | Thebault |
| 4,505,600 A | * | 3/1985 | Suzuki et al. ............... 374/170 |
| 4,546,318 A | | 10/1985 | Bowden |
| 5,611,952 A | * | 3/1997 | Jones ........................ 219/505 |

FOREIGN PATENT DOCUMENTS

| | | |
|---|---|---|
| EP | 0 108 325 A1 | 5/1984 |
| GB | 2 062 322 A | 5/1981 |
| SU | 447630 | 5/1975 |
| SU | 898342 A1 | 1/1982 |
| WO | WO 91/08441 A1 | 6/1991 |

* cited by examiner

*Primary Examiner*—Vincent Q Nguyen
*Assistant Examiner*—John Zhu
(74) *Attorney, Agent, or Firm*—Buchanan Ingersoll & Rooney PC

(57) ABSTRACT

A circuit and method is disclosed for measuring the resistance of a resistive sensor, such as a PTC or NTC temperature sensor used for monitoring the temperature of the windings of an electric motor. The measurement circuit is based on an electronic circuit in which conductors from a sensor located in the object to be monitored are connected to an amplifier circuit in a feedback configuration that reduces the DC level supplied to the voltage divider when the sensor resistance increases. The measured signal is amplified and, using a comparator to compare it with the output voltage of a sawtooth generator, a continuous PWM (Pulse Width Modulation) signal is generated and transmitted in digital format to a SELV electronic circuit, for example through an opto-isolator. The essentially logarithmic signal amplification makes it possible to reliably distinguish between a short circuit in the sensor circuit and low values of sensor resistance.

7 Claims, 5 Drawing Sheets ated MEASUREMENT CIRCUIT FOR SENSOR RESISTANCE

CROSS REFERENCE TO RELATED APPLICATIONS

This application claims priority under 35 U.S.C. §119 to Finnish Application FI20040802 filed in Finland on 10 Jun. 2004, and as a continuation application under 35 U.S.C. §120 to PCT/FI2005/000267 filed as an International Application on 8 Jun. 2005 designating the U.S., the entire contents of which are hereby incorporated by reference in their entireties.

FIELD

The disclosure relates to measuring the resistance of a resistive sensor, such as a PTC or NTC thermistor sensor used for monitoring the temperature of electrical machines, such as the windings of a squirrel cage motor.

BACKGROUND INFORMATION

In addition to protection of a squirrel cage motor based on current measurement, thermistor sensors can be used to protect windings against overheating, for example when the ambient temperature rises or motor cooling is insufficient for any reason. When a squirrel cage motor is used in an explosive atmosphere (Exe), the regulations require that the motor must be equipped with a temperature measurement circuit and the measurement circuit of the thermistor sensor must be galvanically isolated from the other electronic circuits of the system. In practical three-phase motors, three thermistor sensors are connected in series, one for the stator winding of each phase.

One conventional solution is based on AC technology, including an astable multivibrator operating on a selected frequency and a galvanic connection between the measurement circuit and the device electronics. Galvanic isolation is implemented by means of an isolation transformer between the thermistor sensor and measurement circuit. A disadvantage of this solution is the non-linearity of the isolation transformer and its poor response, particularly at low sensor resistance values, which makes it difficult to indicate a short circuit. Another disadvantage is the effect of capacitance in the sensor circuit conductors, which is summed to the measurement circuit through the isolation transformer in addition to the actual effect of the sensor resistance. Galvanic isolation by an isolation transformer is simple to implement, and the solution is inexpensive.

Another conventional solution is the use of a linear opto-isolator, but this causes problems due to the high price of the component and large differences in tolerance between the individual components, which makes the implementation of calibration for the measurement circuit complicated. Reliability and stability in long-term use are poor as well. The advantage of this solution is good linearity over a wide range of resistance and a rapid operating response.

An electric motor manufacturer most typically chooses a PTC thermistor sensor, the resistance of which changes very sharply just below the maximum temperature allowed for the winding insulation. A prior art solution based on this compares the resistance value of the thermistor sensor with a fixed threshold value. Crossover of the threshold value is indicated either by a change in the current load of the isolation transformer or by an opto-isolator. The solution can be inexpensive, but its disadvantage is the ON/OFF type status information; no information is available on the state of change in the resistance value—for example, whether it is approaching the threshold value slowly or rapidly. No indication of a short circuit fault in the sensor circuit is provided either.

There is also an integrated circuit in the market, Maxim Max 6691, that allows the connection of four PTC or NTC sensors. The chip converts the resistance value of each sensor to one Pulse Width Modulated (PWM) pulse; however, the range of the pulse ratio is quite narrow. The PWM pulse ratio decreases with increasing resistance, so the chip is most easily applicable to a NTC sensor. The linear operation of the circuit makes it difficult to distinguish a short circuit from small values of resistance. The measurement range can be adjusted using a resistance connected in series with the sensor, but the usable measurement range in each case is too restricted with regard to an application for measuring the temperature of electric motor windings and protecting them. There is no second-source manufacturer of the chip, which means that it will bind the user to a single component supplier.

There is another integrated circuit, Smartec SMT 160-30, with an internal temperature sensor and PWM output. Due to its physical size and limited operating temperature range, the chip is not applicable to the protection of electric motor windings. The PWM frequency of the chip output is 1 . . . 4 kHz, which also sets excessively tight requirements for the interface component and the circuits for analysing the measurement result.

SUMMARY

Applicants have disclosed measurement circuits that make it possible to measure sensor resistance over a wide resistance range, which enables the use of different types of sensors while still providing a reliable indication of a short circuit or break in the sensor circuit. The disclosed measurement circuit can also be used in situations where high voltage strength (insulation level) is required between the sensor circuit and SELV electronics.

One aspect of the disclosed measurement circuit provides for a resistive sensor that would solve the problems set forth above. This and other aspects will be evident from the disclosure herein.

In addition to sensor resistance measurement, the disclosed measurement circuit can also indicate a short circuit or break in the sensor circuit.

One exemplary embodiment involves an electronic circuit in which conductors from a resistive sensor located in the object to be protected—typically an NTC or PTC temperature sensor—are connected to an amplifier circuit in a feedback configuration within the voltage divider circuit. The amplifier reduces the DC level supplied to the voltage divider when the sensor resistance increases. The signal is amplified, and a continuous Pulse Width Modulation signal is generated using a sawtooth generator and comparator. The signal is transmitted to a SELV electronic circuit in digital format through an opto-isolator.

The frequency of the sawtooth generator can be low, because the time constants of the object of measurement, which are in the order of more than one second, allow for a long response time for the measurement result. This makes it possible to use inexpensive opto-isolators. In order to manage resolution over a wide range of resistance measurement (50Ω . . . 15 kΩ), the intention is to imitate logarithmic response with an amplifier circuit that is as simple as possible. The more the voltage over the sensor increases, the more the amplifier reduces the voltage supplied to the voltage divider circuit. This means that a better resolution is achieved at lower resistance values, which facilitates the indication of a short circuit in the sensor circuit.

The isolation of a digital signal using an opto-isolator is a better method than the isolation of an analogue signal using a linear opto-isolator with poorer long-term stability.

The resolution required for the protection of an electric motor is typically ±7.5%, which means that coarse resolution is enough for the measurement circuit, but the temperature range for measurement is wide, typically extending to temperatures in excess of 150° C.

An exemplary arrangement can allow a wide measurement range, for example 50Ω . . . 15 kΩ, and can be most sensitive in the 1 kΩ . . . 5 kΩ range, which covers the threshold levels of the most common PTC or NTC thermistors. The feedback block used in the solution according to the invention makes it possible to achieve sufficient selectivity for the detection of fault situations—including a short circuit as well as an open circuit. The disclosed embodiments makes it possible to achieve a lower price and easier calibration compared with solutions implemented using a linear opto-isolator. Calibration can be carried out reliably using no more than two measurement points. Another aspect of the disclosed embodiments is that due to the supply voltage feedback block used, the voltage over the sensor resistance is very low, less than 2 V, and it is preferably supplied to the sensor through a series resistor in the order of 20 kΩ. This means that it is very safe to locate the thermistor sensor connected to the circuit within an explosive Ex atmosphere because it remains clearly below the critical levels for electric sparking. The low-frequency PWM technology can be used to enable the use of slightly slower opto-isolators with a high isolation voltage strength. The reliability of opto-isolator operation in long-term use is crucial, so the opto-isolator must be selected from sufficiently high-quality components proportioned to the application.

Alternatively, instead of PWM (Pulse Width Modulation), other encoding methods can be used for encoding the sensor signal into a digital format.

BRIEF DESCRIPTION OF THE DRAWINGS

Additional features and advantages will be apparent to those skilled in the art upon reading the following detailed description of exemplary embodiments which are illustrated in the attached drawings, wherein.

DETAILED DESCRIPTION

Figure 1:
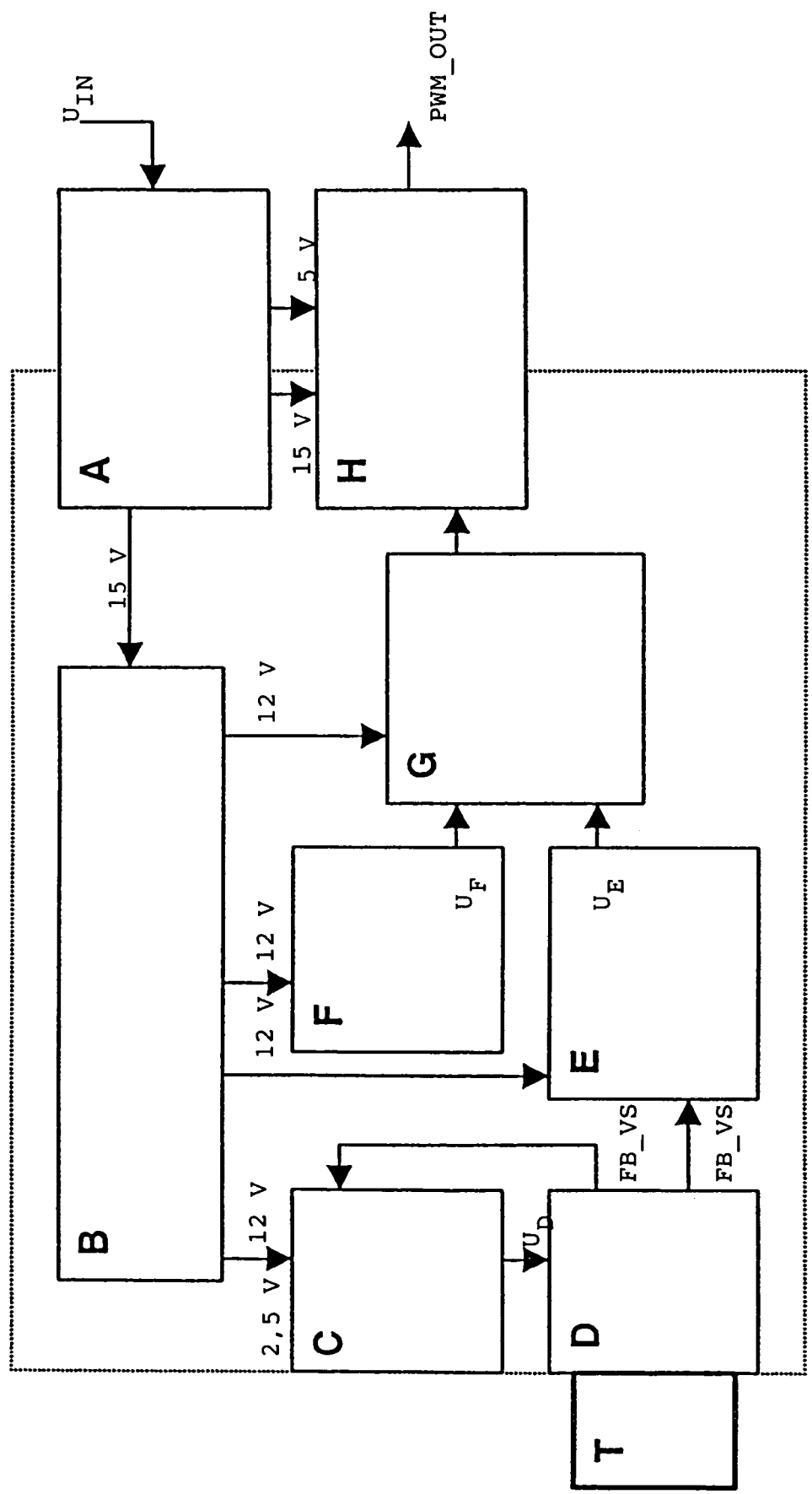
FIG. 1 illustrates an exemplary measurement arrangement as a block diagram.

FIG. 1 illustrates an exemplary sensor measurement electronic circuit as a block diagram. The dotted line limits the area of isolated measurement electronics, with a SELV electronic circuit on the outside.

An exemplary block A comprises a secondary winding of triple-insulated wire added to the ferrite transformer in a DC/DC switching-mode power supply that is already included in the measurement device. This provides the isolated measurement electronics with the required electric power, typically 15 V, 10 mA. Other power supply configurations with the required insulating strength can also be used.

An exemplary block B includes means for generating a regulated DC voltage, such as 12 V, for supplying the measurement electronics; this can be a shunt regulator with associated components.

An exemplary block C comprises an amplifier stage in a feedback configuration that supplies a DC voltage ($U_D$) to the sensor circuit so that when sensor resistance ($R_x$) increases, the supplied voltage level decreases in order to create a function that imitates logarithmic response.

An exemplary block D comprises a voltage divider circuit consisting of a ballast resistor in series with the sensor resistance to be measured. Furthermore, the block includes components associated with EMC filtering and over-voltage protection fulfilling the requirements for Ex circuits.

An exemplary block T comprises the measurement sensor connectors.

An exemplary block E comprises a non-inverting amplifier stage that amplifies the voltage ($U_x$) over the sensor resistance in the voltage divider circuit. Preferably, the amplifier gain is in the order of 8.

An exemplary block F comprises a sawtooth generator for generating a PWM signal. The generator frequency is preferably in the order of 10 . . . 100 Hz. When protecting an electric motor, a time constant that is in the order of more than one second makes it possible to advantageously use a frequency of 40 Hz, for example. The amplitude of the sawtooth wave ($U_F$) is dimensioned to the 10 V level, for example—that is, somewhat lower than the supply voltage level chosen for the electronics, such as 12 V.

An exemplary block G comprises a comparator circuit that compares the amplified sensor voltage signal ($U_E$) and the output voltage ($U_F$) of the sawtooth generator, generating a PWM signal and driving the opto-isolator in block H. In addition to the opto-isolator, block H comprises a series resistance connected to the positive supply voltage, as well as means for keeping the pulse edge sufficiently sharp on the secondary side. The PWM output signal is transmitted from the isolated measurement electronic circuit through the opto-isolator to the main electronic circuit.

In order to manage the resolution of resistance measurement over a wide measurement range (50Ω . . . 15 kΩ), the intention of the amplifier circuit in block C is to imitate logarithmic response using the simplest possible method. At low values of thermistor resistance the output voltage—that is, the PWM ratio—increases proportionally more rapidly than at high resistance values. This makes it easier to distinguish a short circuit from the minimum values of the thermistor sensor. The operation of the feedback block C plays a crucial role in this. The more the voltage ($U_x$) over the sensor increases, the more block C reduces the voltage ($U_D$) supplied to the voltage divider circuit. Provided that a 20 kΩ ballast resistor is connected in series with the thermistor resistance $R_x$, the voltage supplied by block C to the voltage divider circuit can be stated as:

$$U_D = 10V - 6 \cdot U_x \tag{1}$$

So, when observing the 8-fold gain of block E and the 0 . . . 10 V amplitude range of the sawtooth generator (block F), the cycle ratio ($\eta_{OUT}$) of the outgoing PWM signal is:

$$\eta_{OUT} = \frac{8 \cdot R_x}{7 \cdot R_x + 20 \text{ k}\Omega} \tag{2}$$

Figure 2:
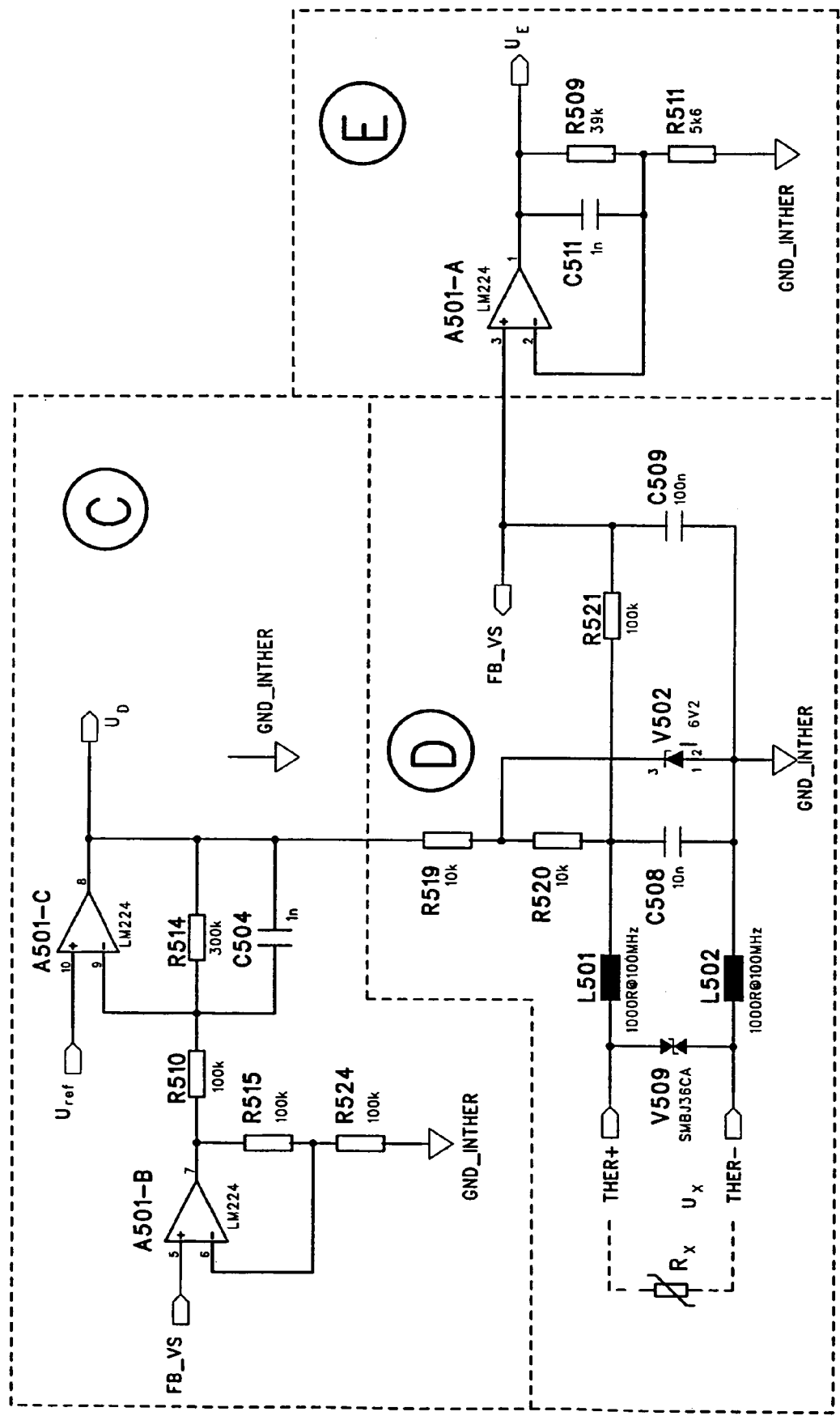
FIG. 2 illustrates the circuit diagram of exemplary blocks C, D and E.

FIG. 2 illustrates an exemplary circuit diagram of a thermistor sensor interface circuit (block D), a feedback amplifier stage (block C) and an amplifier stage (block E).

The operational amplifier (A501-B) in the feedback amplifier stage (block C) together with the resistances (R515, R524) forms a non-inverting amplifier stage with a preferred gain ratio of two. The operational amplifier (A501-C) together with the resistances (R510, R514) and a regulated reference voltage $U_{ref}$ connected to the positive (+) input, for example +2.5 V, forms a differential amplifier with a preferred gain ratio of three. The capacitance (C504) connected in parallel with the resistance (R514) is arranged to stabilise the output voltage of the feedback amplifier stage (block C).

The feedback amplifier stage (block C) supplies a voltage ($U_D$) to the sensor circuit voltage divider. The sensor circuit (block D) includes series resistances (R519, R520) with the combined resistance value chosen so that it is in the same order of magnitude as the sensor resistance value, such as 20 kΩ. A transient protector (V509), for example of the type Fairchild Semiconductor SMBJ36CA, is connected between the sensor terminal connectors (THER+, THER−). Furthermore, a series inductance (L501, L502) is connected to both connectors (THER+, THER−). A capacitance (C508) is connected between the series inductances to filter interference in the signal.

The Ex requirements for explosive atmospheres require that the short circuit current and supply voltage of the sensor may not become too high. For this reason, a Zener diode (V502) is connected to the circuit so that its cathode is connected to the connection point between the series resistances (R519, R520) and its anode is connected to the ground potential of the electronics (GND_INTHER). The nominal voltage of the Zener diode (V502) is in the order of a few volts, preferably 6.2 V. The resistance (R521) and capacitance (C509) form an RC filter for filtering EMC interference out of the sensor voltage ($U_x$) and thus generating the sensor signal FB_VS from the sensor voltage. From the same connection point, the sensor signal (FB_VS) is connected to the amplifier stage (block E) and to the positive (+) input of the operational amplifier (A501-B) within the feedback amplifier circuit (block C). Thus the feedback amplifier circuit reduces the voltage supplied to the sensor circuit when the sensor resistance, and, therefore, the voltage ($U_x$) over the sensor and the sensor signal (FB_VS) increase.

An exemplary amplifier circuit (block E) comprises an operational amplifier (A501-A) and resistances (R509, R511) forming a non-inverting amplifier stage with a preferred gain ratio of eight. The output voltage ($U_E$) from the block is connected to the inverting (−) input of the comparator (block G).

Figure 3:
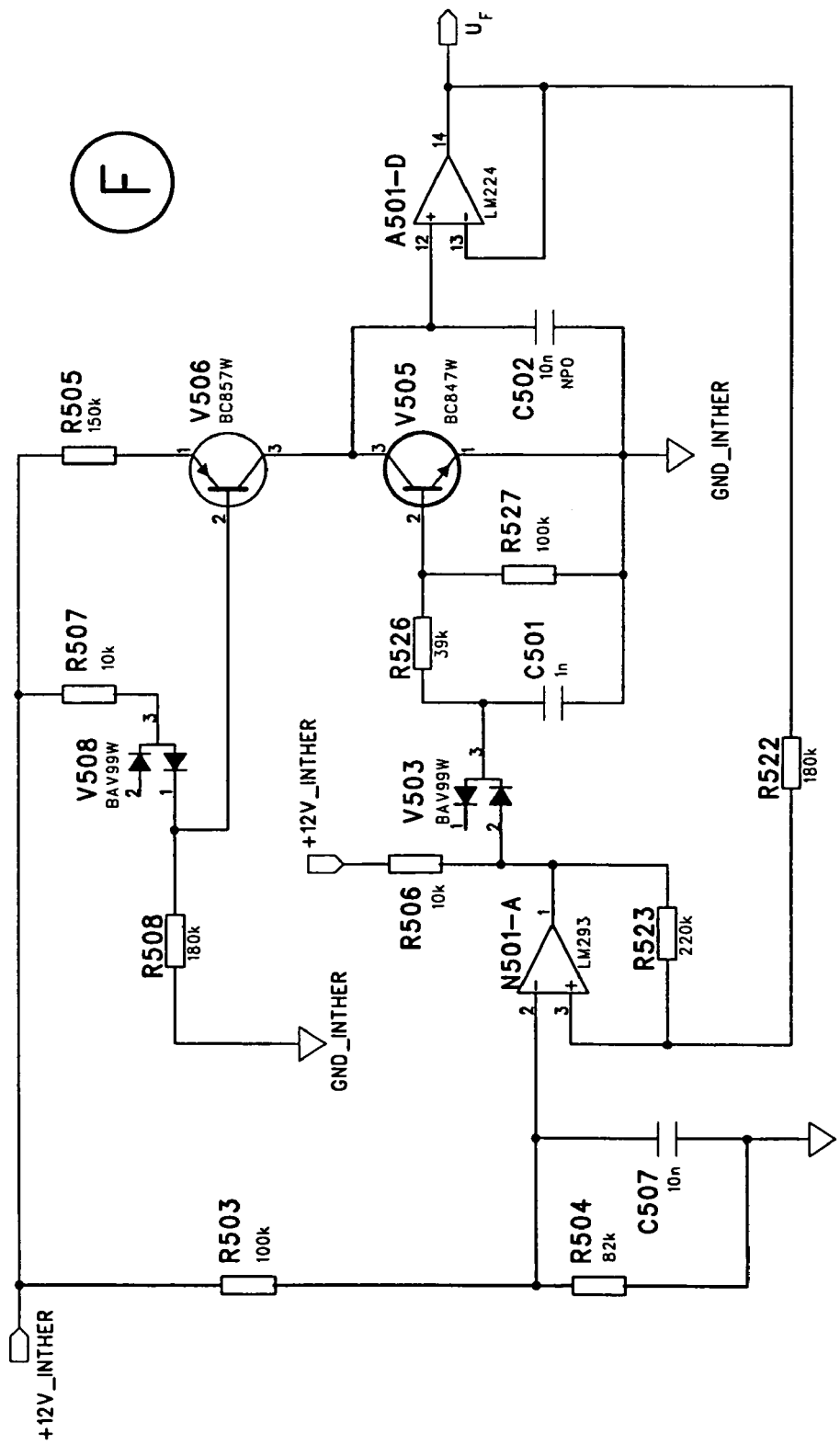
FIG. 3 illustrates the circuit diagram of an exemplary block F.

FIG. 3 illustrates a circuit diagram of an exemplary sawtooth generator (block F). An integrated comparator circuit (N501-A), for example of the type National Semiconductors LM293, together with its associated components forms an astable multivibrator. A voltage divider comprising resistances (R503, R504) together with a capacitance (C507) generates a bias voltage to the inverting (−) input of the comparator (N501-A). Resistances (R507, R508, R505), a diode (V508) and a PNP transistor (V506) form a constant-current supply that charges the capacitance (C502) and forms the positive ramp of the sawtooth wave. A voltage follower formed of an operational amplifier (A501-D) supplies the output voltage of the sawtooth generator ($U_F$). The ratio of the resistances (R522, R523) connected to the non-inverting (+) input of the comparator circuit (N501-A) together with the bias voltage connected to the inverting (−) input determines the turning point of the sawtooth wave. A diode (V503) and a capacitance (C501) together with a voltage divider (R526, R527) at the base of a NPN transistor (V505) are used to create a time delay in the change of the state of the transistor from saturation to non-conductive state, which ensures that the output voltage of the sawtooth wave drops close to zero.

Figure 4:
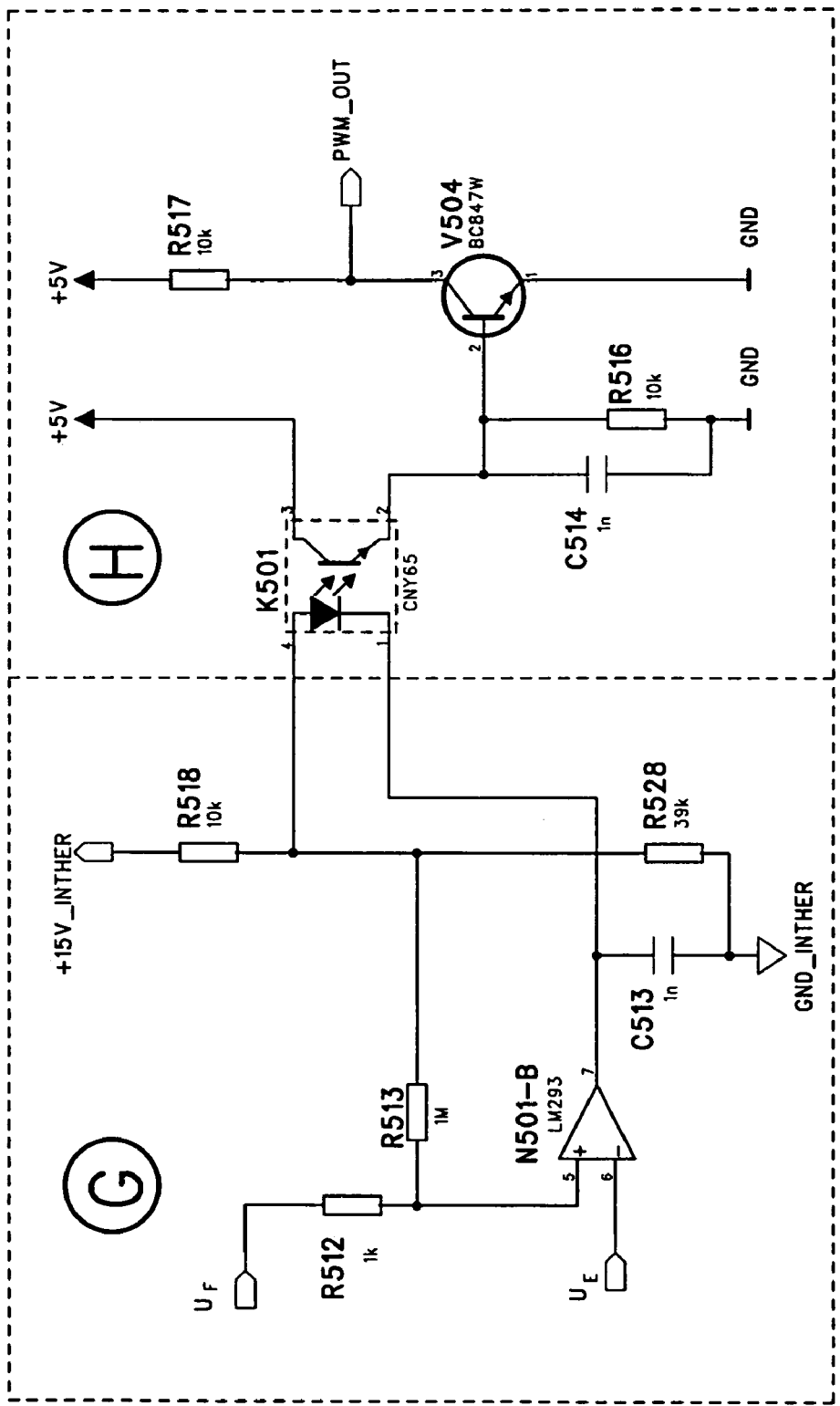
FIG. 4 illustrates the circuit diagram of exemplary blocks G and H.

FIG. 4 illustrates a circuit diagram of an exemplary comparator (block G) and an exemplary isolation and output circuit (block H).

An exemplary comparator block (G) comprises an integrated comparator circuit (N501-B) and a pull-up resistor (R518). In addition, hysteresis has been created with resistances (R512, R513, R528), which, together with a capacitance (C513), prevents oscillation of the circuit. The amplified sensor signal ($U_E$) from the amplifier block (block E) is connected to the inverting (−) input of the comparator (N501-B) and the output signal of the sawtooth generator ($U_F$) is connected to the non-inverting (+) input.

The opto-isolator block (block H) comprises an opto-isolator (K501) and, on the secondary side of the opto-isolator, an NPN transistor (V504), a base-emitter resistance (R516) and a collector pull-up resistance (R517) that prevent the phototransistor within the opto-isolator (K501) from going into saturation and creating a sharper edge for the PWM pulse. The capacitance (C514) connected in parallel with the resistance (R516) is arranged to limit EMC interference.

Figure 5:
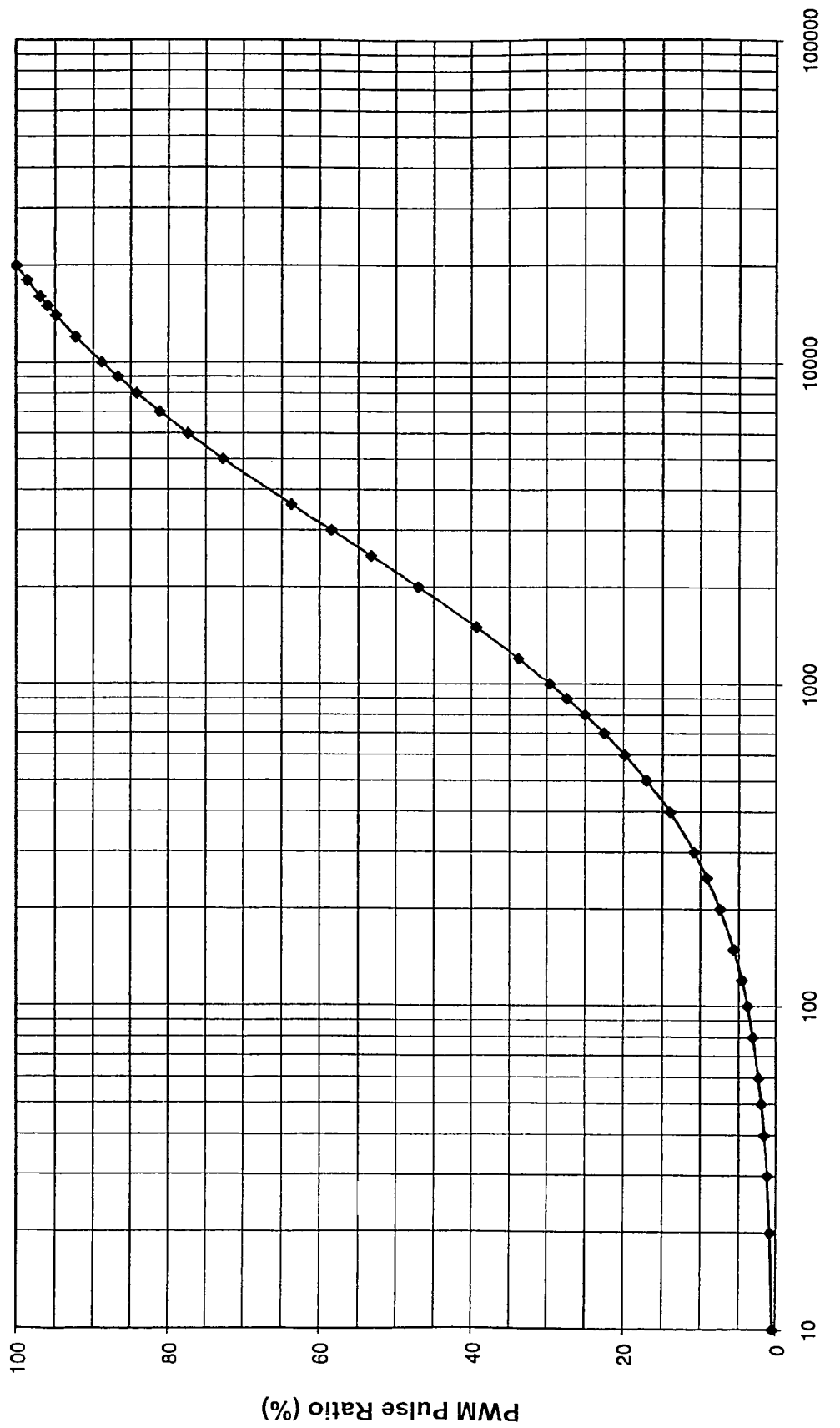
FIG. 5 is a graph of an exemplary PWM pulse ratio [%] as a function of sensor resistance.

FIG. 5 is a graph where an exemplary PWM pulse ratio [%] of the output of a measurement arrangement implemented with the component values in the circuit diagrams of FIGS. 2, 3 and 4 is presented on the vertical axis as a function of the sensor resistance [Ω] presented on the logarithmic scale of the horizontal axis. The graph indicates a very linear area within the sensor resistance range of 1 kΩ . . . 5 kΩ that is typical for applications, and shows that the PWM pulse ratio increases rapidly in proportion to the increase in sensor resistance at low resistance values.

Even though the exemplary embodiments are particularly described, it must be understood that a person skilled in the art will be able to apply the exemplary disclosures in different forms within the limits specified by the claims.

The invention is applicable to any resistance measurement, and its measurement range can be easily customised to the application by changing the component values in the circuit. For example, the resistance of very low-resistance sensors (less than 1Ω) can be measured, although the current supply requirement increases. The solution according to the invention can be inexpensive, so it is also economically well applicable to resistance measurement circuits where isolation is not even required.

Furthermore, the invention can be applied to the measurement of a capacitive sensor if the ballast resistor is replaced with a high-quality capacitor connected in series. In this case, filter capacitors cannot be used at the inputs of the operational amplifiers within the amplifier stages (block C and block E). It will be easiest to use a voltage follower circuit with a high input impedance as a common pre-stage for these blocks and connect signal interference filtering to the output of this stage.

An alternative method of transmitting the PWM output signal to the measurement electronics side instead of an opto-isolator can be implemented by the comparator (block G) connecting an additional load resistor parallel to block A (the DC/DC transformer). The additional secondary current flowing through the load resistor will be indicated as increased current in the primary winding of the DC/DC transformer on the main electronics side as well, and this can be detected by measuring the voltage drop of a small series resistor connected to the primary winding. Advantages of this embodiment include cost savings and increased long-term component reliability, but, correspondingly, the PWM frequency must be reduced from 40 Hz to less than 10 Hz, which will increase the response time of the measurement arrangement.

Instead of PWM encoding, the sensor signal can be encoded into digital format using some other method.

It will be appreciated by those skilled in the art that the present invention can be embodied in these and other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A sensor resistance measurement circuit comprising:
   a sensor connection that connects a resistive sensor to a voltage divider circuit,
   means for supplying voltage to said voltage divider circuit, said means for supplying voltage comprising a non-inverting amplifier stage for amplifying the sensor signal and a differential amplifier stage which, based on the difference between the amplified sensor signal connected to its inverting input and a regulated reference voltage connected to its non-inverting input, is arranged to supply the voltage to the voltage divider circuit,
   said voltage divider circuit comprising:
      a resistance in series with the sensor, and
      means for filtering the voltage over the sensor resistance into a sensor signal, and
   means for processing and further transmitting the sensor signal, wherein the means for supplying voltage to the voltage divider circuit have been arranged to reduce the supplied voltage as a function of the sensor resistance.

2. The measurement circuit according to claim 1, wherein the means for processing and further transmitting the sensor signal comprises:
   means for amplifying the sensor signal into a signal voltage,
   a sawtooth generator,
   a comparator for generating a pulse-encoded PWM signal as a result of a comparison between the signal voltage and the output voltage of said sawtooth generator, and
   means for further transmitting said PWM signal.

3. A method for measuring sensor resistance, the method comprising:
   supplying a voltage to a voltage divider circuit and, within said circuit, further through a series resistance to a resistive sensor,
   filtering the voltage over the resistive sensor into a sensor signal and processing said sensor signal for further transmission,
   wherein the voltage supplied to the voltage divider circuit is reduced as a function of a resistance of the resistive sensor, and the voltage supplied to the voltage divider circuit is essentially reduced as a logarithmic function of the sensor resistance.

4. The method according to claim 3, comprising:
   amplifying the sensor signal into a signal voltage, and
   comparing the signal voltage with a sawtooth wave in order to generate a pulse-encoded PWM signal for further transmission.

5. A resistance measurement circuit that measures a resistance of a first resistive element, the circuit comprising:
   a voltage divider circuit having a connector that receives the first resistive element, said voltage divider circuit comprising:
      a second resistive element that is connected in series with the first resistive element, and
      a filter that filters the voltage over the first resistive element into a signal;
   a voltage supply that supplies voltage to said voltage divider circuit; and
   a first circuit that processes and further transmits the signal;
   wherein the voltage supply reduces the supplied voltage as a function of the resistance of the first resistive element; and
   wherein the supplied voltage is essentially reduced as a logarithmic function of the resistance of the first resistive element.

6. The measurement circuit according to claim 5, wherein the voltage supply comprises:
   a non-inverting amplifier stage that amplifies the signal; and
   a differential amplifier stage which, on the basis of the difference between the amplified signal connected to its inverting input and a regulated reference voltage connected to its non-inverting input, supplies a voltage to the voltage divider circuit.

7. The measurement circuit according to claim 5, wherein the first circuit comprises:
   an amplification circuit that amplifies the signal into a signal voltage;
   a sawtooth generator;
   a comparator that generates a pulse-encoded PWM signal as a result of a comparison between the signal voltage and the output voltage of said sawtooth generator; and
   a second circuit configured to further transmit said PWM signal.

* * * * *